United States Patent Office 3,042,723
Patented July 3, 1962

3,042,723
PREPARATION OF BORON ALKYLS
Herbert Jenkner, Hannover-Wulfel, Germany, assignor to Kali-Chemie Aktiengesellschaft, Hannover, Germany
No Drawing. Filed Sept. 26, 1960, Ser. No. 58,173
Claims priority, application Germany Sept. 26, 1959
5 Claims. (Cl. 260—606.5)

The invention relates to the preparation of boron alkyls.

I have found that boron alkyls can be prepared in very simple manner from naturally available boron compounds or boron trioxide and aluminum alkyls, whereby the yield, calculated on the aluminum alkyl, is almost quantitative when the boron compounds have been carefully dehydrated under the conditions set forth below.

Suitable starting materials are salts of boric acid, particularly the alkali metal and alkaline earth metal salts, such as borax ($Na_2B_4O_7 \cdot 10H_2O$), kernite $$(Na_2B_4O_7 \cdot 4H_2O)$$

and others. For carrying out the reaction, said salts have to be completely dehydrated at relatively low temperatures. For instance, in order to obtain a boron trioxide suitable for the reaction, it must be prepared by careful dehydration of a boric acid, such as metaboric or orthoboric acid, in vacuo at a temperature of about 150 to 250° C., whereby the boron trioxide is obtained in a particularly reactive state. Alkali metal and alkaline earth metal borates are dehydrated in a similar manner. The most important condition for obtaining the starting boron compound in a reactive state is its preparation or dehydration respectively at a temperature as low as possible. For this purpose it is recommended to carry out the dehydration in vacuo. The other conditions of dehydration as pressure and time will depend on the temperature chosen. A very low dehydration temperature will require a very low pressure of course. For instanct working at a temperature of 150°–220° C. (bath temperature) a suitable pressure range is about 1–20 mm. Hg.

The thus obtained dehydrated boron compounds are then reacted under exclusion of moisture and oxygen at elevated temperature with an alkyl aluminum halide, particularly with a dihalide or sesquihalide. As alkyl aluminum halides I prefer to employ methyl, ethyl, or propyl sesquichlorides and dichlorides, such as

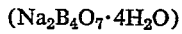

$$Al_2Cl_3(C_2H_5)_3, \quad AlCl_2(CH_3)$$

The higher aluminum alkyl chlorides are generally less suitable. Though I prefer the chlorides, other halides such as the bromides may also be employed. Of particular advantage is the use of the complex salts of alkali metal halides with the alkyl aluminum dihalides, e.g. $NaAlCl_3R$, wherein R is alkyl.

The reaction is preferably carried out in the atmosphere of an inert gas, such as nitrogen or argon, and is extremely simple; suspending agents or solvents may be used but are not required. Neither is it necessary to operate at elevated pressure. It is sufficient, for instance, to heat anhydrous alkali metal borate with an alkyl aluminum halide or its alkali metal chloride complex at a temperature of about 150° to 250° C. The $BR_3$ formed by the reaction distills off continuously. It is of advantage either to add anhydrous boron trioxide or borate portionwise to the heated alkyl aluminum chloride slowly with stirring, or to add gradually alkyl aluminum chloride to the heated dehydrated borate or boron trioxide, which are preferably suspended in a suspending medium. In this reaction, the entire alkyl bound to aluminum is converted to boron trialkyl. Contamination by boron alkyl halides does not take place or is negligible.

If the reaction mixture shall be stirred until the reaction is terminated, inert suspending liquids may be used, which do not react with the organic aluminum and boron compounds. Such liquids are, for instance, mineral oil, paraffin oils, and higher silicon tetraalkyls or other inert liquids having a boiling point above 200° C.

For the preparation of lower boron alkyls having a low boiling point, such as boron trimethyl, it may be of advantage to apply slightly elevated pressures.

The following examples illustrate the invention.

Example 1

Borax was dehydrated by heating under reduced pressure in an oil bath at 230° C. 20.2 parts by weight of said anhydrous borax, $Na_2B_4O_7$, were suspended in 128 parts by weight of ethyl aluminum sesquichloride (Cl content 48.7%) and heated under nitrogen as protective gas in an oil bath to 200°–210° C. Within 3 hours, 36.8 parts of boron triethyl distilled off and were recovered. Yield: 94 percent of theory.

Example 2

Boron trioxide was prepared by vacuum dehydration (10–12 mm. Hg) of boric acid at 150° to 220° C. (oil bath). 14 parts by weight of said boron trioxide were suspended in 130 parts of ethyl aluminum sesquichloride $(C_2H_5)_3Al_2Cl_3$ containing 48.7% Cl, and the suspension was heated for 4 hours at 200° to 250° C. on an oil bath. During the reaction, 36.1 parts by weight of boron triethyl distilled off, corresponding to a yield of 92%. The reaction residue was white and solid.

Example 3

Example 2 was repeated only with the difference that a boron trioxide was used which was not obtained by vacuum dehydration at low temperatures but which was prepared in the usual manner i.e. dehydration by heating boric acid to a temperature of 500° to 900° C. at normal pressure. This boron trioxide which had a glassy appearance was pulverized to a very fine powder before being reacted with the ethyl aluminum sesquichloride.

The reaction conditions—i.e. temperature, time and amount of reactants—being the same as in Example 2, the yield of boron triethyl was 4.1 parts by weight, that is 10.5% of theory. The reaction residue was liquid and dark in contrast to Example 2.

Example 3 shows that it is not possible to use any boron trioxide for the reaction according to the invention, but that high yields are only obtained if a boron trioxide is used which was prepared at low temperatures as described.

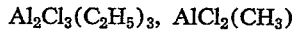

I claim:
1. A method for the preparation of boron trialkyls comprising reacting an anhydrous boron compound selected from the group consisting of boron trioxide, alkali metal borates, and alkaline earth metal borates, which boron compounds were dehydrated in vacuo at a temperature below about 250° C., with a lower alkyl aluminum chloride at a temperature of about 50° to 250° C., and distilling off the formed boron trialkyl.

2. The method as claimed in claim 1 wherein a boron compound is used which had been dehydrated in vacuo at a temperature of about 150° to 220° C.

3. The method as claimed in claim 1, wherein said alkyl aluminum chloride is a member of the group consisting of lower alkyl aluminum sesquichlorides and lower alkyl aluminum dichlorides.

4. The method as claimed in claim 1, wherein said alkyl aluminum chloride is applied in the form of its complex compound with alkali metal chloride.

5. The method as claimed in claim 1 wherein said anhydrous boron compound is borax.

References Cited in the file of this patent
UNITED STATES PATENTS

| | | |
|---|---|---|
| 2,853,527 | Perrine | Sept. 23, 1958 |
| 2,934,566 | Murib et al. | Apr. 26, 1960 |
| 2,951,093 | Anderson | Aug. 30, 1960 |

OTHER REFERENCES

Jacobson: Encyclopedia of Chemical Reactions, volume I, Reinhold Publ. Corp., New York, 1946, page 68.

Lappert: Chem. Reviews, vol. 56, page 1029 (1956).